United States Patent
Yi et al.

(10) Patent No.: US 8,716,899 B2
(45) Date of Patent: May 6, 2014

(54) POWER RECEIVING APPARATUS AND WIRELESS POWER TRANSCEIVING SYSTEM

(75) Inventors: Kang-hyun Yi, Chungcheongnam-do (KR); Sung-jin Choi, Gunpo-si (KR); Joon-hyun Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 671 days.

(21) Appl. No.: 12/879,607

(22) Filed: Sep. 10, 2010

(65) Prior Publication Data

US 2011/0234011 A1 Sep. 29, 2011

(30) Foreign Application Priority Data

Mar. 29, 2010 (KR) .......................... 10-2010-0027874

(51) Int. Cl.
*H01F 27/42* (2006.01)

(52) U.S. Cl.
USPC .......................................... 307/104

(58) Field of Classification Search
USPC .......................................... 307/104
See application file for complete search history.

(56) References Cited

U.S. PATENT DOCUMENTS

| | | | |
|---|---|---|---|
| 5,471,118 A | 11/1995 | Nilssen | |
| 5,701,243 A | 12/1997 | Youn et al. | |
| 6,324,080 B1 * | 11/2001 | Laeuffer | 363/25 |
| 6,504,314 B1 | 1/2003 | Gradzki et al. | |
| 6,683,800 B2 | 1/2004 | Loef et al. | |
| 6,834,000 B2 * | 12/2004 | Croulard et al. | 363/16 |
| 7,193,868 B2 | 3/2007 | Yasumura | |
| 8,212,415 B2 * | 7/2012 | Kojima | 307/104 |
| 8,441,812 B2 * | 5/2013 | Ueno et al. | 363/21.02 |

(Continued)

FOREIGN PATENT DOCUMENTS

| | | |
|---|---|---|
| CA | 2 277 187 A1 | 5/1999 |
| EP | 0 951 806 A1 | 5/1999 |

(Continued)

OTHER PUBLICATIONS

Communication dated Dec. 26, 2012, issued by the United States Patent and Trademark Office in counterpart U.S. Appl. No. 12/879,769.

*Primary Examiner* — Jared Fureman
*Assistant Examiner* — Duc M Pham
(74) *Attorney, Agent, or Firm* — Sughrue Mion, PLLC

(57) ABSTRACT

A wireless power transceiving system includes a power transmitting apparatus which converts power into a resonance wave and transmits the resonance wave, and a power receiving apparatus which receives the transmitted resonance wave, and converts the resonance wave into DC power using a parallel resonant rectifier circuit that is impedance matched with impedance generated in the power receiving apparatus by parasitic components at a frequency of the resonance wave.

14 Claims, 10 Drawing Sheets

(56) References Cited

U.S. PATENT DOCUMENTS

| | | | |
|---|---|---|---|
| 2004/0130915 A1* | 7/2004 | Baarman | 363/21.02 |
| 2006/0209576 A1 | 9/2006 | Yasumura | |
| 2008/0101803 A1* | 5/2008 | Richard Lum et al. | 398/209 |
| 2008/0224544 A1 | 9/2008 | Koyama | |
| 2009/0289506 A1 | 11/2009 | Harres | |
| 2010/0109444 A1 | 5/2010 | Lemmens | |
| 2010/0109445 A1 | 5/2010 | Kurs et al. | |
| 2010/0148723 A1* | 6/2010 | Cook et al. | 320/108 |
| 2010/0181842 A1 | 7/2010 | Suzuki et al. | |
| 2010/0289449 A1* | 11/2010 | Elo | 320/108 |
| 2011/0046438 A1 | 2/2011 | Iwaisako | |
| 2011/0062790 A1* | 3/2011 | Kouki et al. | 307/104 |
| 2011/0127953 A1 | 6/2011 | Walley et al. | |
| 2012/0001563 A1 | 1/2012 | Rimmer et al. | |
| 2012/0164943 A1* | 6/2012 | Bennett | 455/41.1 |

FOREIGN PATENT DOCUMENTS

| | | |
|---|---|---|
| EP | 1 701 433 A2 | 9/2006 |
| EP | 1 701 433 A3 | 9/2006 |
| JP | 11-136994 A | 5/1999 |
| KR | 10-2000-0069993 A | 11/2000 |
| KR | 10-2006-0099426 A | 9/2006 |
| KR | 10-2008-0005687 A | 1/2008 |
| WO | 99/25158 A1 | 5/1999 |

* cited by examiner

POWER RECEIVING APPARATUS AND WIRELESS POWER TRANSCEIVING SYSTEM

CROSS-REFERENCE TO RELATED APPLICATION

This application claims priority from Korean Patent Application No. 10-2010-0027874, filed in the Korean Intellectual Property Office Mar. 29, 2010, the disclosure of which is incorporated herein by reference in its entirety.

BACKGROUND

1. Field

Apparatuses and methods consistent with exemplary embodiments relate a power receiving apparatus and a wireless power transceiving system, and more particularly, to a power receiving apparatus which may enhance power transmission efficiency by adjusting impedance generated by a parasitic inductance in a rectifier circuit which operates at high frequency and a wireless power transceiving system thereof.

2. Description of the Related Art

With the development of information and telecommunication technology, various mobile electronic products are being introduced, and thus the number of mobile electronic goods that a user is carrying around is also increasing.

Since most of these mobile electronic products operate with a battery, a method for charging the mobile electronic products is being developed. Particularly, wireless power transmission technology may provide power supply without using an electric wire by using electromagnetic resonance.

Lately, it became possible to design a resonator having 80% of efficiency for electromagnetic resonance, but the efficiency of a circuit still remains low, depressing overall efficiency of a wireless power transceiving apparatus.

Specifically, a full wave rectifier is used to rectify wirelessly transmitted power in the related art wireless power transmission method. However, in order to use electromagnetic resonance, a circuit should be operated in a MHz range. However, it is difficult to realize high transmission efficiency in the related art rectifier circuit.

More specifically, a related art rectifier circuit performs rectification using a diode. However, when the diode operates at high frequency, its impedance increases due to a parasitic component, such as, for example, parasitic inductance. As a result, high frequency AC input voltage is not rectified properly, which leads to loss and consequently, to degradation of efficiency in the wireless power transceiving apparatus.

In addition, if a load connected to the output of a rectifier circuit changes from a maximum load to a minimum load, the impedance changes due to a parasitic component and the load, and thus the scale of rectified voltage also changes. In particular, since rectified voltage increases when a load decreases in the resonance method, the burden of a DC/DC converter increases if the DC/DC converter is connected to the backend of a rectified circuit, deteriorating efficiency even further.

Accordingly, a rectifier circuit which improves efficiency of a wireless power transceiving apparatus and outputs rectified output voltage consistently even with changes in a load is needed.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

Exemplary embodiments provide a power receiving apparatus which may enhance power transmission efficiency by adjusting impedance generated by a parasitic inductance in a rectifier circuit which operates at high frequency and a wireless power transceiving system using the same.

Exemplary embodiments also provide a power receiving apparatus which maintains output voltage of a rectifier circuit even with changes in a load and a wireless power transceiving system thereof.

According to an aspect of an exemplary embodiment, there is provided a wireless power transceiving system including a power transmitting apparatus which converts power into a resonance wave and transmits the resonance wave and a power receiving apparatus which receives the transmitted resonance wave, and converts the resonance wave into DC power using a parallel resonant rectifier circuit that is impedance matched with impedance generated in the power receiving apparatus by parasitic components at a frequency of the resonance wave.

The power receiving apparatus may include a reception resonator which receives the transmitted resonance wave and a parallel resonant rectifier circuit which converts the received resonance wave into DC power and is impedance matched with impedance generated in the power receiving apparatus by parasitic components at a frequency of the resonance wave.

The parallel resonant rectifier circuit may include a first diode in which an anode is connected to one end of the reception resonator and a cathode is connected to a first output node, a second diode in which a cathode is connected to one end of the reception resonator and an anode is connected to a second output node, a first capacitive element one end of which is connected to the other end of the reception resonator and the other end of which is connected to the first output node, and a second capacitive element one end of which is connected to the other end of the reception resonator and the other end of which is connected to the second output node.

The power receiving apparatus may further include a smoothing circuit which is connected to the first output node and the second output node in parallel.

The power receiving apparatus may further include an adjusting unit which adjusts capacitance of the first capacitive element and the second capacitive element so that specific impedance of the power receiving apparatus is adjusted according to a load connected to the first output node and the second output node in parallel.

The capacitive element may be at least one of a capacitor, a variable capacitor and a circuit in which a plurality of variable capacitors and switch elements in series are connected in parallel.

The power transmitting apparatus may include a power unit which provides power and a transmission resonator which converts the provided power into a resonance wave and transmits the resonance wave to the power receiving apparatus.

According to an aspect of another exemplary embodiment, there is provided a power receiving apparatus including a reception resonator which receives a resonance wave transmitted from outside, a parallel resonant rectifier circuit which converts the received resonance wave into DC power and is impedance matched with impedance generated in the power receiving apparatus by parasitic components at a frequency of the resonance wave, and a load unit which consumes the rectified DC power.

The parallel resonant rectifier circuit may include a first diode in which an anode is connected to one end of the reception resonator and a cathode is connected to a first output node, a second diode in which a cathode is connected to one end of the reception resonator and an anode is connected to a second output node, a first capacitive element one end of which is connected to the other end of the reception resonator and the other end of which is connected to the first output node, and a second capacitive element one end of which is connected to the other end of the reception resonator and the other end of which is connected to the second output node.

The power receiving apparatus may further include a smoothing circuit which is connected to the first output node and the second output node in parallel.

The power receiving apparatus may further include an adjusting unit which adjusts capacitance of the first capacitive element and the second capacitive element so that specific impedance of the power receiving apparatus is adjusted according to a load of the load unit.

The capacitive element may be at least one of a capacitor, a variable capacitor and a circuit in which a plurality of variable capacitors and switch elements in series are connected in parallel.

The wireless power receiving apparatus may be at least one of a remote controller and 3D glasses which communicate with a display apparatus wirelessly.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
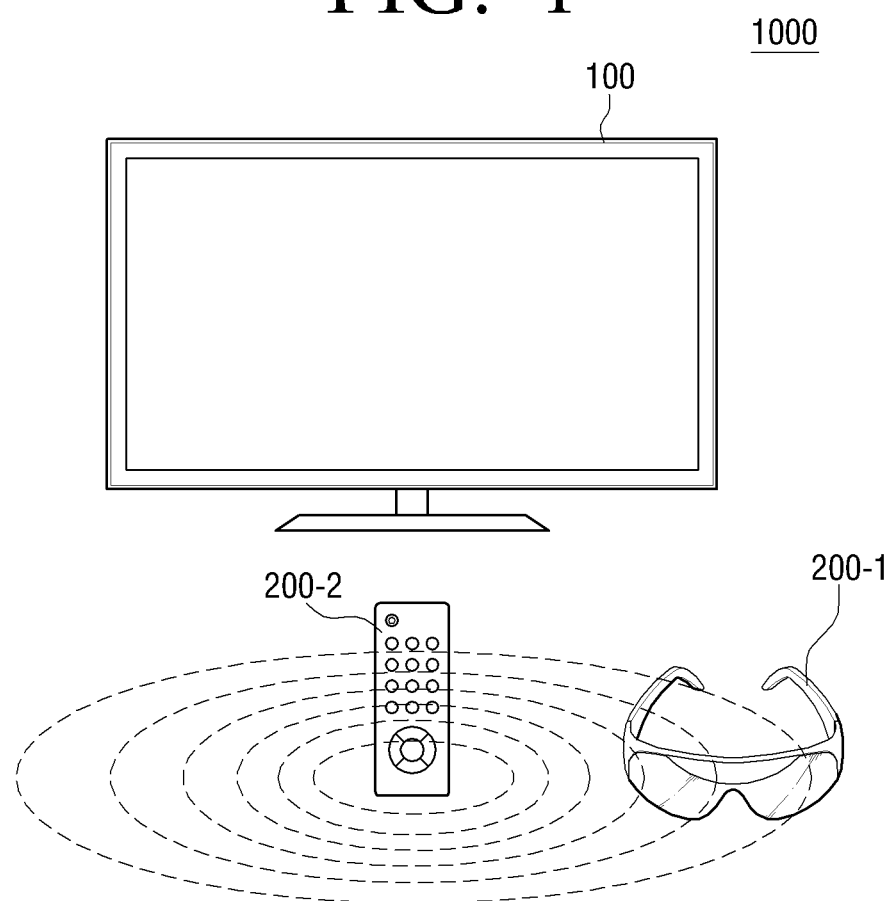
FIG. 1 is a view illustrating a wireless power transceiving system according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a wireless power transceiving system according to an exemplary embodiment.

Referring to FIG. 1, a wireless power transceiving system 1000 includes a power transmitting apparatus 100 and a power receiving apparatus 200. The power transmitting apparatus 100 may include a display apparatus, such as a television or an electronic frame, and the power receiving apparatus 200 may include a remote device, such as 3D glasses 200-1 or a remote controller 200-2, or an apparatus which performs wireless communication.

The power transmitting apparatus 100 may convert power into a resonance wave and transmit the resonance wave. The detailed configuration and operation of the power transmitting apparatus 100 is described in detail below with reference to FIG. 2.

When located in the vicinity of the power transmitting apparatus 100, the power receiving apparatus 200 may receive power wirelessly via the generated resonance wave. The detailed configuration and operation of the power receiving apparatus 200 is described in detail below with reference to FIG. 3.

In the exemplary embodiment of FIG. 1, the power receiving apparatus 200 operates in the vicinity of the power transmitting apparatus 100. When the power receiving apparatus 200 with the battery is located in the vicinity of the power transmitting apparatus 100, the power receiving apparatus 200 may charge the battery using the provided resonance wave and operate remotely using the power charged in the battery. For example, the power transmitting apparatus 100 may perform wireless communication with the power receiving apparatus 200. Alternatively, the power transmitting apparatus 100 may also be realized as a power cradle which provides only power to the power receiving apparatus 200.

Figure 2:
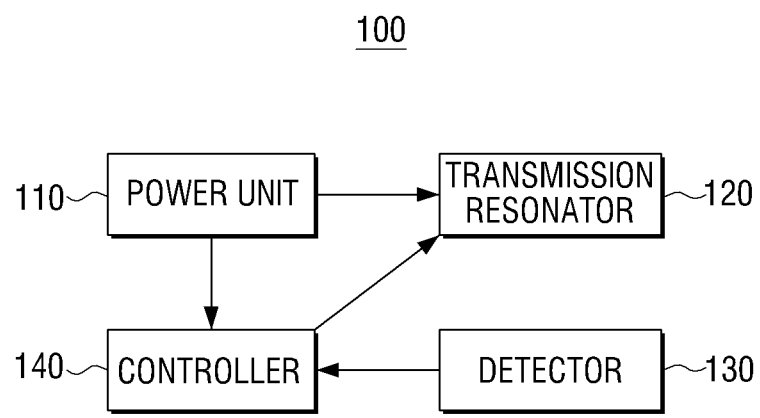
FIG. 2 is a block diagram illustrating a detailed configuration of the power transmitting apparatus of FIG. 1.

FIG. 2 is a block diagram illustrating a detailed configuration of the power transmitting apparatus 100 of FIG. 1.

Referring to FIG. 2, the power transmitting apparatus 100 may include a power unit 110, a transmission resonator 120, a detector 130, and a controller 140.

The power unit 110 provides power to components of the power transmitting apparatus 100 under the control of the controller 140 which is described in detail below. Specifically, the power unit 110 may receive power provided externally to the power transmitting apparatus 100, convert the input power into the voltage for the components of the power transmitting apparatus 100, and provide the converted power to the components.

The transmission resonator 120 converts the provided power into a resonance wave and transmits the resonance wave to the power receiving apparatus 200. The resonance wave may be an electronic wave having a selected resonant frequency. For example, the resonant frequency may range from 1 MHz to 10 MHz.

Specifically, the transmission resonator 120 is a resonance circuit with a selected resonant frequency and includes an inductance (L) and a capacitance (C). The transmission resonator 120 is activated by the power provided from the power unit 110, and may generate a resonance wave having a selected resonant frequency such that the reception resonator 210 of the power receiving apparatus 200 may generate resonance. The reception resonator 210 may receive power wirelessly via the resonance wave generated by the reception resonator 120.

The detector 130 detects whether the power receiving apparatus 200 is located within a predetermined area. Specifically, the detector 130 may detect whether the power receiving apparatus 200 exists within a predetermined area using wireless communication, such as radio frequency (RF) communication or Bluetooth, or a detection sensor, such as a web camera.

The controller 140 may control the components of the power transmitting apparatus 100. Specifically, if it is detected that the power receiving apparatus 200 is located within a predetermined area of the power transmitting apparatus 100, the controller 140 may control the power unit 110 and the transmission resonator 120 to generate a resonance wave having a selected resonant frequency.

In the exemplary embodiment, the controller 140 may generate a resonance wave only when the power receiving apparatus 200 requests power transmission. Specifically, even though the power receiving apparatus 200 is located within a predetermined area, the controller 140 may control the power unit 110 and the transmission resonator 120 to generate a resonance wave only when the power receiving apparatus 200 requests power transmission through the detector 130.

Figure 3:
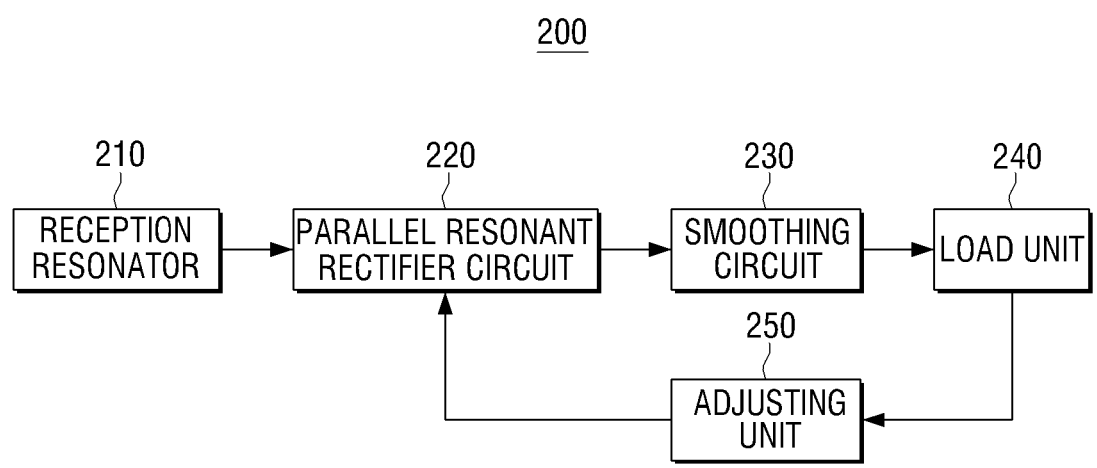
FIG. 3 is a block diagram illustrating a detailed configuration of the power receiving apparatus of FIG. 1.

FIG. 3 is a block diagram illustrating a detailed configuration of the power receiving apparatus 200 of FIG. 1.

Referring to FIG. 3, the power receiving apparatus 200 may include a reception resonator 210, a parallel resonant rectifier circuit 220, a smoothing circuit 230, a load unit 240, and an adjusting unit 250.

The reception resonator 210 receives a resonance wave transmitted from an external source. Specifically, the reception resonator 210 may receive the generated resonance wave from the power transmitting apparatus 100 and generate AC power.

The parallel resonant rectifier circuit 220 may rectify AC power generated by the reception resonator 210 into DC power. Specifically, the parallel resonant rectifier circuit 220 may include two series-connected diodes 221, 222, and two series-connected capacitive elements 223, 224 in the form of an H bridge. The detailed circuit structure is described below with reference to FIG. 4.

Capacitive values of the capacitive elements 223, 224 of the parallel resonant rectifier circuit 220 may be selected or adjusted to regulate impedance in the power receiving apparatus 200. Specifically, the capacitive elements 223, 224 may have selected capacitance values so that the impedance generated by parasitic inductance of the diodes 221, 222 during high frequency operation may be removed. In this case, the capacitive elements 223, 224 may have capacitance values which are impedance matched with the impedance generated in the power receiving apparatus 200 by parasitic inductance. The capacitive elements 223, 224 may include, for example, a capacitor, a variable capacitor, a circuit, in which variable capacitors each connected in parallel to a switch element, are connected in series, or a circuit, in which variable capacitors each series-connected to a switch element, are connected in parallel.

The smoothing circuit 230 may smooth power rectified by the parallel resonant rectifier circuit 220. Specifically, the smoothing circuit 230 may be connected in parallel to output nodes of the parallel resonant rectifier circuit 220, and smooth the output power of the parallel resonant rectifier circuit 220.

The load unit 240 consumes rectified DC power. Specifically, the load unit 240 receives power which is converted into DC power by the parallel resonant rectifier circuit 220 and smoothed by the smoothing circuit 230 and performs the function of the power receiving apparatus 200. In the exemplary embodiment, the load unit 240 may include the battery, which may be recharged using the rectified DC power.

The adjusting unit 250 may maintain the output voltage of the parallel resonant rectifier circuit 220 consistently. Specifically, the adjusting unit 250 measures the load amount of the load unit 240 and maintains the output voltage at the first and second output nodes 260, 270 of the parallel resonant rectifier circuit 200 by adjusting capacitance values of the capacitive elements 223, 224 according to the measured load amount. The detailed operation of the adjusting unit 250 is described below with reference to FIG. 10.

Figure 4:
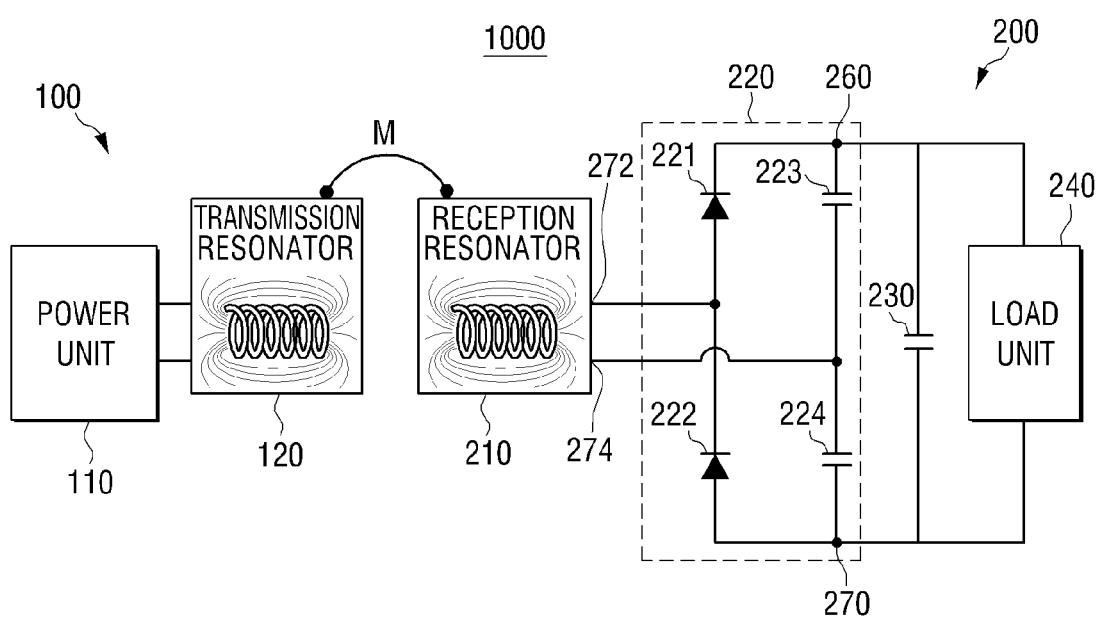
FIG. 4 is a circuit diagram of a wireless power transceiving system according to an exemplary embodiment.

FIG. 4 is a circuit diagram of a wireless power transceiving system according to an exemplary embodiment.

Referring to FIG. 4, the power transmitting apparatus 100 includes the power unit 110 and the transmission resonator 120, and may generate a resonance wave to transmit power wirelessly. The detailed operation of the power transmitting apparatus 100 is described above with reference to FIG. 2.

The power receiving apparatus 200 of FIG. 4 includes the reception resonator 210, the parallel resonant rectifier circuit 220, the smoothing circuit 230, and the load unit 240.

The reception resonator 210 receives a resonance wave generated by the transmission resonator 120, and generates AC power corresponding to the received resonance wave.

The smoothing circuit 230 includes a capacitive element connected to a first output node 260 and a second output node 270 in parallel, and may smooth the rectified power of the parallel resonant rectifier circuit 220.

The parallel resonant rectifier circuit 220 receives AC power generated by the received resonance wave from the reception resonator 210, and rectifies the received AC power into DC power. Specifically, the parallel resonant rectifier circuit 220 includes two series-connected diodes 221, 222 and two series-connected capacitive elements 223, 224.

The anode of the first diode 221 is connected to a first terminal 272 of the reception resonator 210, and the cathode is connected to the first output node 260. In this case, the first output node 260 is a node which outputs the rectified power and at which the cathode of the first diode 221 is connected to the first capacitive element 223.

The anode of the second diode 222 is connected to the second output node 270 and the cathode of the second diode 222 is connected to the first terminal 272 of the reception resonator 210. In this case, the second output node 270 is a node which outputs the rectified power and at which the anode of the second diode 222 is connected to the second capacitive element 224.

Figure 10:
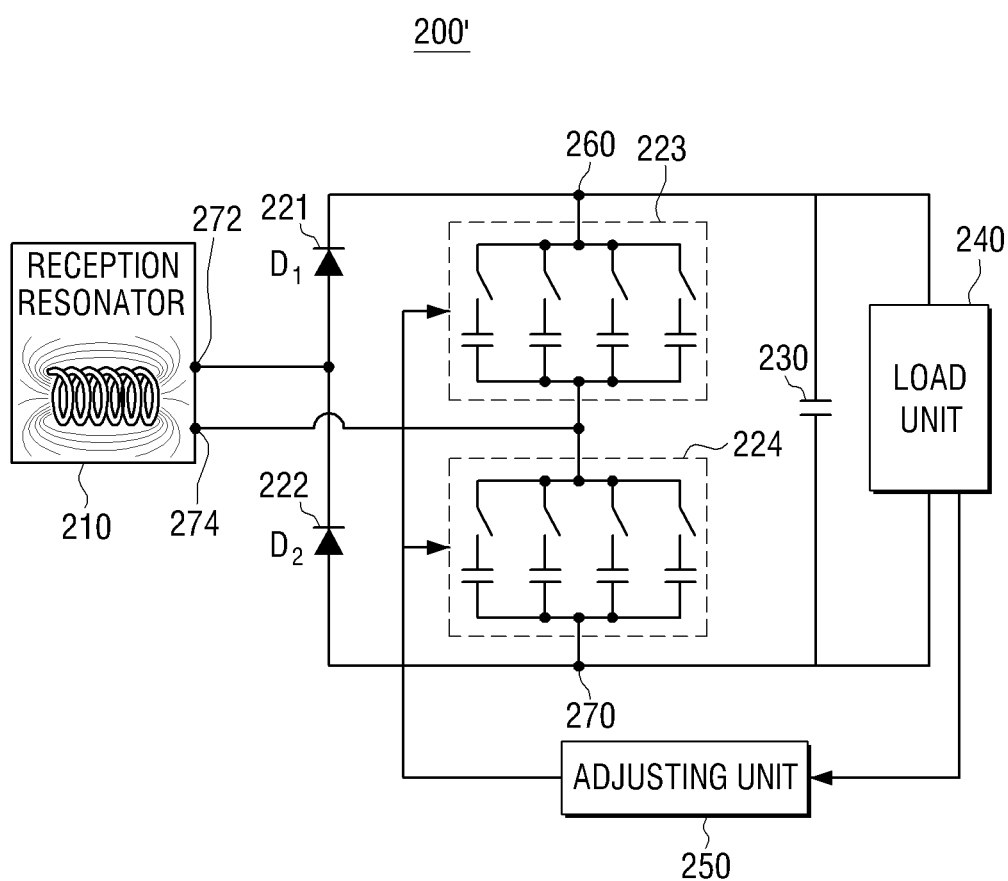
FIG. 10 is a circuit diagram of a power receiving apparatus according to another exemplary embodiment.

The first capacitive element 223 is connected to a second terminal 274 of the reception resonator 210, and to the first output node 260. Specifically, the first capacitive element 223 may include a capacitor. In the exemplary embodiment, a plurality of capacitors, each connected in series to a switch element may be connected in parallel in a circuit as illustrated in FIG. 10.

The second capacitive element 224 is connected to the second terminal 274 of the reception resonator 210, and to the second output node 270. Specifically, the second capacitive element 224 may include a capacitor.

A diode is a circuit element which closes or opens depending on the voltage value of each end, and may transmit electric current without power waste if the voltage of both ends exceeds a predetermined value, and may end transmission if the voltage of both ends is below the predetermined value.

Figure 5:
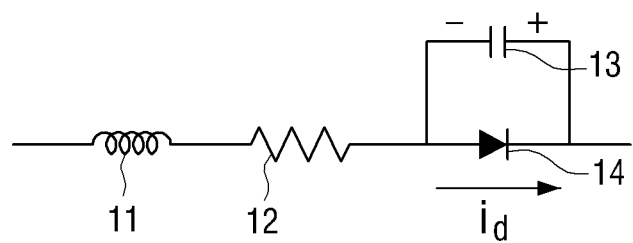
FIG. 5 is an equivalent circuit of a diode operating at high frequency.

However, the actual diode has a parasitic inductance, a parasitic capacitance, and a parasitic resistance, and such diode may be modeled as illustrated in FIG. 5.

Specifically, the modeling diode includes a parasitic inductor 11, a parasitic resistor 12, a parasitic capacitor 13, and a desired diode 14. Typically, parasitic components have very small values, and thus such parasitic components may be disregarded when a circuit operates at low frequency. However, the impedance of a parasitic inductance and a parasitic capacitance changes according to operation frequency, and thus the impedance values may be taken into consideration when the circuit operates at high frequency. In particular, since the rectifier circuit in the power receiving apparatus 200 rectifies AC power in a range of $10^6$ Hz frequencies as described above, the impedance generated by a parasitic inductance of the diode may be removed.

According to an exemplary embodiment, in order to remove the impedance generated by the parasitic inductance, the impedance of the power receiving apparatus 200 may be adjusted using the capacitive elements 223, 224 with the selected capacitance values.

The detailed operation of adjusting the impedance of the power receiving apparatus 200 using the capacitive elements 223, 224 is described below with reference to FIGS. 6 to 9.

Figure 6:
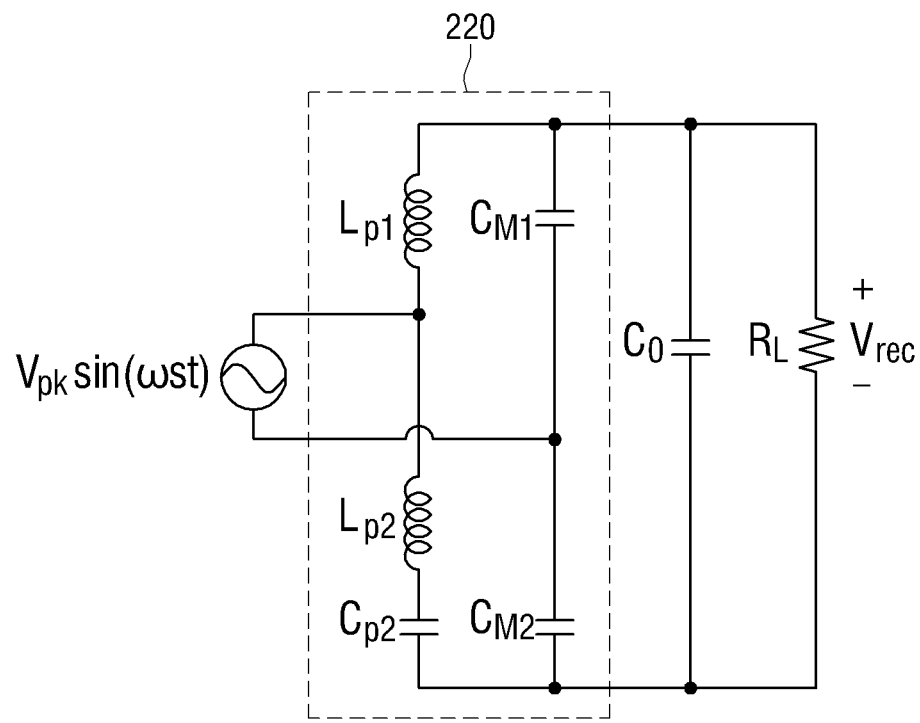
FIG. 6 is a circuit diagram of a power receiving apparatus reflecting an equivalent circuit of a diode during half frequency of AC power.

FIG. 6 is a circuit diagram of a power receiving apparatus reflecting an equivalent circuit of a diode during half frequency of AC power. Specifically, if the AC power generated by the reception resonator 210 has a phase ranging from 0 degree to 180 degrees, only a parasitic inductance $L_{P1}$ affects a circuit in the modeling diode for the first diode 221 (a desired diode 14 closes). A parasitic inductance $L_{P2}$ and a parasitic capacitance $C_{P2}$ affect a circuit in the modeling diode for the second diode 222 (a desired diode 14 opens). In FIG. 6, $C_{M1}$ represents capacitance of the first capacitive element 223, $C_{M2}$ represents capacitance of the second capacitive element 224, $C_o$ represents capacitance of the smoothing circuit 230, and $R_L$ represents resistance of the load unit 240. Since the scale of resistance of a resistor does not change according to a frequency, a parasitic resistor is not illustrated in FIG. 6.

Figure 7:
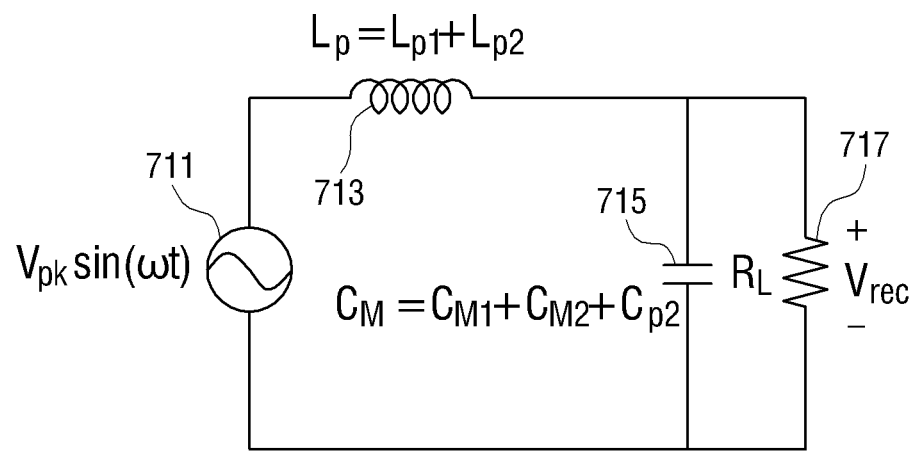
FIG. 7 is the equivalent circuit of the circuit diagram of FIG. 6.

Various inductors and capacitors of FIG. 6 may be represented by an equivalent circuit illustrated in FIG. 7. Specifically, inductor 713 represents circuit parasitic inductance $L_P=L_{P1}+L_{P2}$, a capacitor 715 represents the parallel resonant rectifier circuit capacitance $C_M=C_{M1}+C_{M2}+C_{P2}$, a resistor 717 represents the load resistance $R_L$, and a voltage device 711 represents the AC voltage $V_P=V_{PK} \sin(\omega t)$.

A ratio of the output voltage value $V_{rec}$ of the parallel resonant rectifier circuit 220 to the AC voltage value $V_P$ generated by the reception resonator 210 may be calculated using the equivalent circuit of FIG. 7 according to Equation 1:

$$\frac{V_{rec}}{V_p} = \frac{1}{\sqrt{[(\pi^2/8(1-\omega^2/\omega_0^2))^2+(\omega/(\omega_0 Q))^2]}} \quad [\text{Equation 1}]$$

In the above equation, $\omega_o$ represents the resonant frequency of the equivalent circuit illustrated in FIG. 7, $\omega_0=1/\sqrt{(L_P C_M)}$, $Q=R_{OC}/\sqrt{(L_P/C_M)}$, and $$R_{OC} = \frac{\pi 2}{8} R_L.$$

Figure 8:
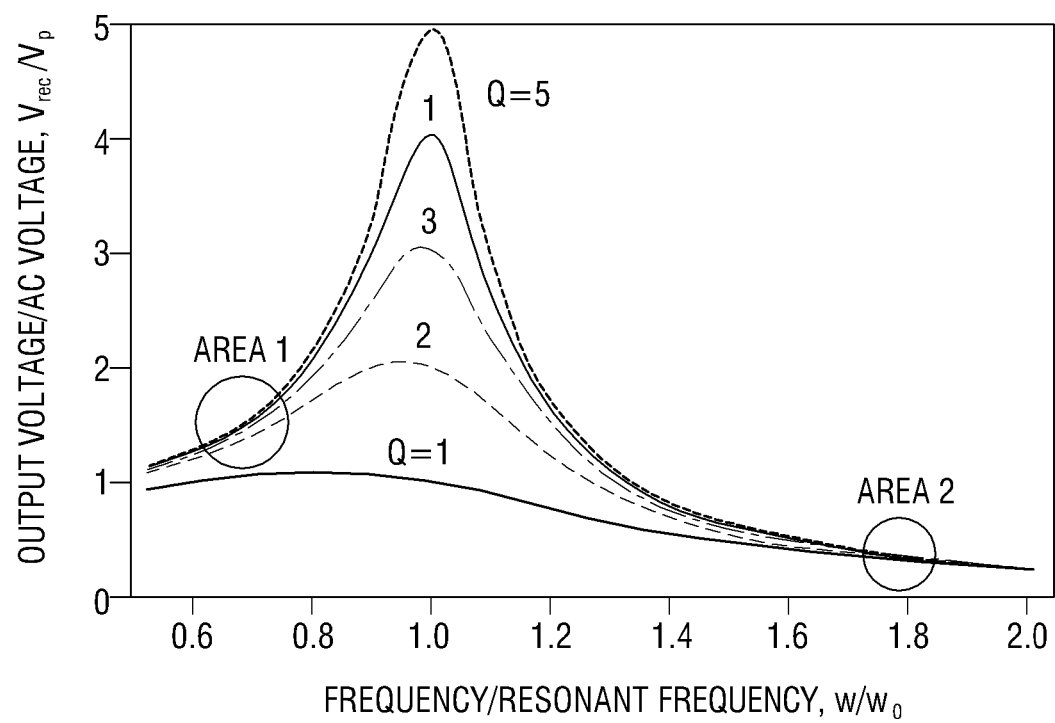
FIG. 8 is a voltage gain curve of a power receiving apparatus according to an exemplary embodiment.

FIG. 8 illustrates a voltage gain curve of a power receiving apparatus according to an exemplary embodiment, based on Equation 1. X-axis represents a ratio of frequency ω of the AC voltage $V_P$ generated by the reception resonator 210 to the resonant frequency $\omega_o$. Y-axis represents a ratio of the output voltage value $V_{rec}$ of the parallel resonant rectifier circuit 220 to the AC voltage $V_P$ generated by the reception resonator 210.

Referring to FIG. 8, the maximum gain may be obtained if the resonant frequency $\omega_o$ of the power receiving apparatus 200 is the same as the frequency ω of the AC voltage $V_P$ generated by the reception resonator 210. In addition, the output gain curve varies according to an impedance ratio which is a Q-factor of a load, that is, a load resistor versus a resonant tank. As shown above by Equation 1, Q-factor of a resonant tank and the resonant frequency $\omega_o$ of the power receiving apparatus may be adjusted by adjusting the capacitance values of the capacitive elements 223, 224, and thus a power receiving apparatus may be implemented by adjusting the capacitance values of the capacitive elements 223, 224 according to the requirements of a system. Specifically, if a system requires a gain which is not sensitive to the change of load, area 1 or area 2 shown in FIG. 8 may be used. If area 1 is used, voltage higher than the peak of the received voltage may be obtained. If area 2 is used, low voltage may be obtained.

Figure 9:
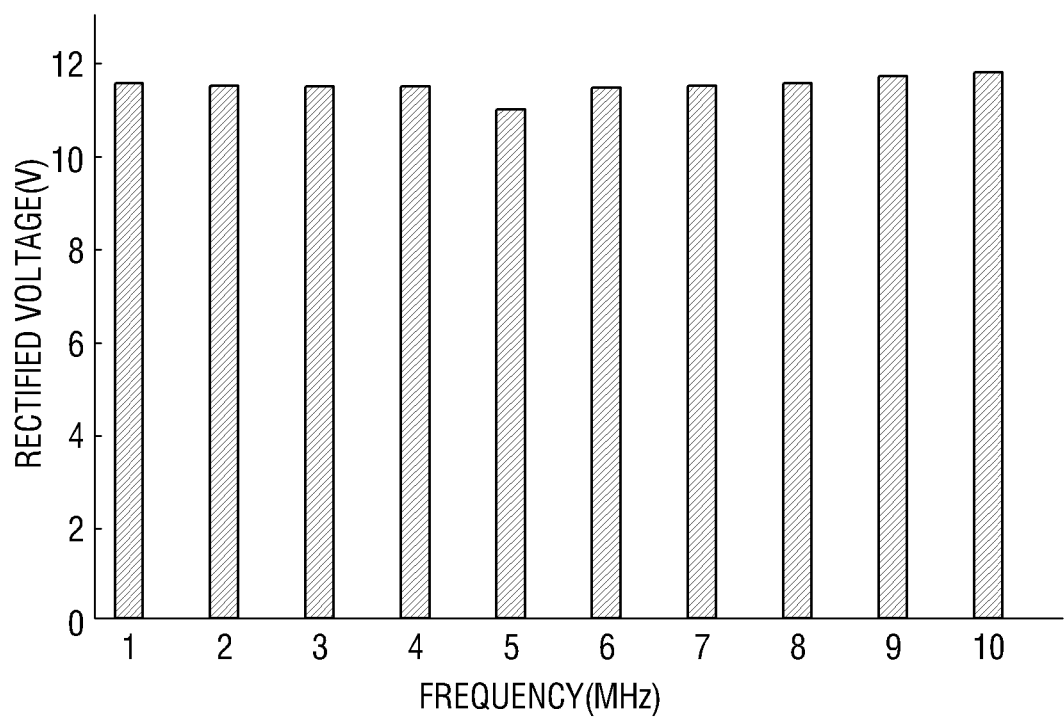
FIG. 9 is a view illustrating voltage rectified according to frequency of a power receiving apparatus according to an exemplary embodiment.

FIG. 9 is a view illustrating voltage rectified according to a frequency of a power receiving apparatus according to an exemplary embodiment. Specifically, FIG. 9 shows data obtained by applying values in Table 1 to the power receiving apparatus illustrated in FIG. 4.

TABLE 1

| | |
|---|---|
| Source Frequency, ω | 1 MHz~10 MHz |
| Generated AC voltage, $V_P$ | 10sinωt |
| Parasitic inductance ($L_P$) | 8 nH |
| $C_{M1}$, $C_{M2}$ | 4.7 nF |

When the above values are used, the resonant frequency $\omega_o$ of the power receiving apparatus 100 may be approximately 13 MHz while the frequency ω of AC power generated by the reception resonator 210 may be in the range of 1 MHz-10 MHz. That is, area 1 in FIG. 8 is used. Referring to FIG. 9, the frequency ω of AC power has a high output value so that the frequency ω of AC power may be the same as the resonant frequency $\omega_o$ of the power receiving apparatus 100.

FIG. 10 is a circuit diagram of a power receiving apparatus according to another exemplary embodiment.

Comparing FIG. 4 with FIG. 10, each capacitive element 223, 224 includes a plurality of capacitors and a plurality of switch elements. The capacitive elements 223, 224 may have different capacitance values according to the connection state of a plurality of switch elements. In the exemplary embodiment of FIG. 10, each capacitive element 223, 224 includes four capacitors connected in parallel to one another and each connected to a corresponding switch element in series, but this is only an example. A capacitive element may also include more or fewer capacitors connected in series to one another and each connected to a corresponding switch element in parallel.

As described above, the capacitive elements 223, 224 may have various capacitance values, and thus the adjusting unit 250 may adjust the capacitance values of the capacitive elements 223, 224 according to the load state of the adjusting unit 250 to maintain the output voltage of a parallel resonant rectifier circuit consistent. Specifically, as described above, the impedance value may vary according to the capacitance values of the capacitive elements 223, 224, and thus the adjusting unit 250 may keep the output voltage of the parallel resonant rectifier circuit 220 consistent by adjusting the capacitance value. The capacitance value may be adjusted, as for example, by opening and closing selected switches.

Therefore, even when a load changes, the power receiving apparatus 200 may maintain an output voltage value by changing its impedance, according to an exemplary embodiment.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A wireless power transceiving system, comprising:
a power transmitting apparatus which converts power into a resonance wave and transmits the resonance wave; and
a power receiving apparatus which receives the transmitted resonance wave, and converts the resonance wave into DC power, wherein the power receiving apparatus comprises a parallel resonant rectifier circuit that is impedance matched with impedance generated in the power receiving apparatus by parasitic components at a frequency of the resonance wave,
wherein the parallel resonant rectifier circuit comprises:
a first diode in which an anode is connected to a first terminal of the reception resonator and a cathode is connected to a first output node;
a second diode in which a cathode is connected to the first terminal of the reception resonator and an anode is connected to a second output node;
a first capacitive element which is connected to a second terminal of the reception resonator and to the first output node; and
a second capacitive element which is connected to the second terminal of the reception resonator and to the second output node;
wherein the first diode and the second diode generate the parasitic components at the frequency of the resonance wave, and
capacitive values of the first capacitive element and the second capacitive element are specified to counter the impedance generated in the power receiving apparatus by the parasitic components.

2. The wireless power transceiving system as claimed in claim 1, wherein the power receiving apparatus further comprises a reception resonator which receives the transmitted resonance wave, and
wherein the parallel resonant rectifier circuit converts the received resonant wave into DC power.

3. The wireless power transceiving system as claimed in claim 1, wherein the power receiving apparatus further comprises:
a smoothing circuit which is connected in parallel to the first output node and the second output node.

4. The wireless power transceiving system as claimed in claim 3, wherein the power receiving apparatus further comprises:
an adjusting unit which adjusts capacitance values of the first capacitive element and the second capacitive element so that the impedance of the power receiving apparatus is adjusted according to a load of a load unit connected in parallel to the first output node and the second output node.

5. The wireless power transceiving system as claimed in claim 1, wherein each of the first capacitive element and the second capacitive element comprises at least one of a capacitor, a variable capacitor, and a circuit in which a plurality of variable capacitors, each of which connected in series to a corresponding switch element, are connected in parallel to one another.

6. The wireless power transceiving system as claimed in claim 1, wherein the power transmitting apparatus comprises:
a power unit which provides power; and
a transmission resonator which converts the provided power into the resonance wave and transmits the resonance wave to the power receiving apparatus.

7. A power receiving apparatus comprising:
a reception resonator which receives a resonance wave transmitted from an external source;
a parallel resonant rectifier circuit which converts the received resonance wave into DC power and is impedance matched with impedance generated in the power receiving apparatus by parasitic components at a frequency of the resonance wave; and
a load unit which consumes the DC power,
wherein the parallel resonant rectifier circuit comprises:
a first diode in which an anode is connected to a first terminal of the reception resonator and a cathode is connected to a first output node;
a second diode in which a cathode is connected to the first terminal of the reception resonator and an anode is connected to a second output node;
a first capacitive element which is connected to a second terminal of the reception resonator and to the first output node; and
a second capacitive element which is connected to the second terminal of the reception resonator and to the second output node; and
wherein the first diode and the second diode generate the parasitic components at the frequency of the resonance wave, and
capacitive values of the first capacitive element and the second capacitive element are specified to counter the impedance generated in the power receiving apparatus by the parasitic components.

8. The power receiving apparatus as claimed in claim 7, further comprising:
a smoothing circuit which is connected in parallel to the first output node and the second output node.

9. The power receiving apparatus as claimed in claim 7, further comprising:
an adjusting unit which adjusts capacitance values of the first capacitive element and the second capacitive element so that the impedance of the power receiving apparatus is adjusted according to a load of the load unit.

10. The power receiving apparatus as claimed in claim 7, wherein each of the first capacitive element and the second capacitive element comprises at least one of a capacitor, a variable capacitor, and a circuit in which a plurality of variable capacitors, each of which connected in series to a corresponding switch element, are connected in parallel to one another.

11. The power receiving apparatus as claimed in claim 7, wherein the wireless power receiving apparatus comprises at least one of a remote controller and three-dimensional glasses which communicate wirelessly with a display apparatus.

12. An apparatus comprising:
a first device which converts electric power into a resonance wave and wirelessly transmits the resonance wave; and
a second device which receives the transmitted resonance wave and converts the resonance wave into DC power, wherein the second device is impedance matched with impedance generated in the second device by parasitic components at a frequency of the resonance wave;
wherein the second device comprises:
- a first diode having an anode is connected to a first terminal of the reception resonator and a cathode is connected to a first output node;
- a second diode having a cathode is connected to the first terminal of the reception resonator and an anode is connected to a second output node;
- a first capacitive element which is connected to a second terminal of the reception resonator and to the first output node;
- a second capacitive element which is connected to the second terminal of the reception resonator and to the second output node,
- wherein the first diode and the second diode generate the parasitic components at the frequency of the resonance wave, and capacitive values of the first capacitive element and the second capacitive element are specified to counter the impedance generated in the second device by the parasitic components.

13. The apparatus as claimed in claim 12, wherein at least one of the first capacitive element and the second capacitive element comprises capacitors connected in parallel to one another and each connected in series to a corresponding switch element.

14. The apparatus as claimed in claim 13, wherein the second device further comprises:
- an adjusting unit which adjusts the capacitance values of at least one of the first capacitive element and the second capacitive element by turning on and off the capacitors by closing and opening the corresponding switching elements to regulate the impedance of the second device.

* * * * *